US010940959B2

(12) United States Patent
Kekan et al.

(10) Patent No.: US 10,940,959 B2
(45) Date of Patent: Mar. 9, 2021

(54) CONFIGURABLE DISTRIBUTED HEALTH MONITORING SYSTEM FOR A LANDING SYSTEM

(71) Applicant: Simmonds Precision Products, Inc., Vergennes, VT (US)

(72) Inventors: Rajendra S. Kekan, Maharashtra (IN); Sanat Kumar Choudhury, Karnataka (IN); Steven M. Levy, Burlington, VT (US); Skanda Gopalakrishna, Karnataka (IN)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 103 days.

(21) Appl. No.: 16/225,108

(22) Filed: Dec. 19, 2018

(65) Prior Publication Data
US 2020/0108950 A1 Apr. 9, 2020

(30) Foreign Application Priority Data
Oct. 5, 2018 (IN) .............................. 201811037755

(51) Int. Cl.
B64F 5/60 (2017.01)
B64D 45/00 (2006.01)
B64D 45/04 (2006.01)

(52) U.S. Cl.
CPC ............ *B64F 5/60* (2017.01); *B64D 45/0005* (2013.01); *B64D 45/04* (2013.01); *B64D 2045/0085* (2013.01)

(58) Field of Classification Search
CPC ....... B64F 5/60; B64D 45/0005; B64D 45/04; B64D 2045/0085; G07C 5/008; G07C 5/0841; G07C 5/0808

USPC ............................................................ 701/3
See application file for complete search history.

(56) References Cited

U.S. PATENT DOCUMENTS

| 8,262,019 | B2 | 9/2012 | Schmidt et al. |
| 8,827,309 | B1 * | 9/2014 | Ouellet ............... B60S 9/08 |
| | | | 280/763.1 |
| 9,342,481 | B2 | 5/2016 | Swearingen et al. |
| 9,671,314 | B2 | 6/2017 | Followell et al. |
| 9,773,357 | B2 | 9/2017 | Fazeli et al. |
| 2009/0061897 | A1 | 3/2009 | Hamilton et al. |

(Continued)

OTHER PUBLICATIONS

Extended EP Search Report for application No. 19201706.9-1009, dated Feb. 26, 2020; 9 pages.

*Primary Examiner* — Muhammad Shafi
(74) *Attorney, Agent, or Firm* — Cantor Colburn LLP

(57) ABSTRACT

Provided are embodiments for techniques for monitoring components of a system, where the techniques include determining an operational status of one or more processing modules, wherein the one or more processing modules comprise one or more local memories, and configuring the one or more local memories with threshold values for configuration parameters for one or more components. The techniques also include sensing sensor data for the one or more components, determining the health status of the one or more components by comparing sensor data for the configuration parameters to the threshold values for the configuration parameters, and transmitting the sensor data and the health status of the one or more components to a central server for storing the sensor data and the health status.

18 Claims, 7 Drawing Sheets

(56) References Cited

U.S. PATENT DOCUMENTS

| | | |
|---|---|---|
| 2010/0121504 A1 | 5/2010 | Jones et al. |
| 2013/0079955 A1 | 3/2013 | Masiello et al. |
| 2015/0049746 A1 | 2/2015 | Hershko et al. |
| 2017/0017736 A1* | 1/2017 | Beale .................. G06F 30/20 |
| 2017/0116617 A1* | 4/2017 | Nance ................ G06Q 30/018 |
| 2017/0322069 A1* | 11/2017 | Mastrianni ............ G01G 19/12 |
| 2018/0116004 A1* | 4/2018 | Britt ................ H04W 28/0263 |
| 2018/0205658 A1* | 7/2018 | Sullivan ................ H04W 4/42 |

* cited by examiner

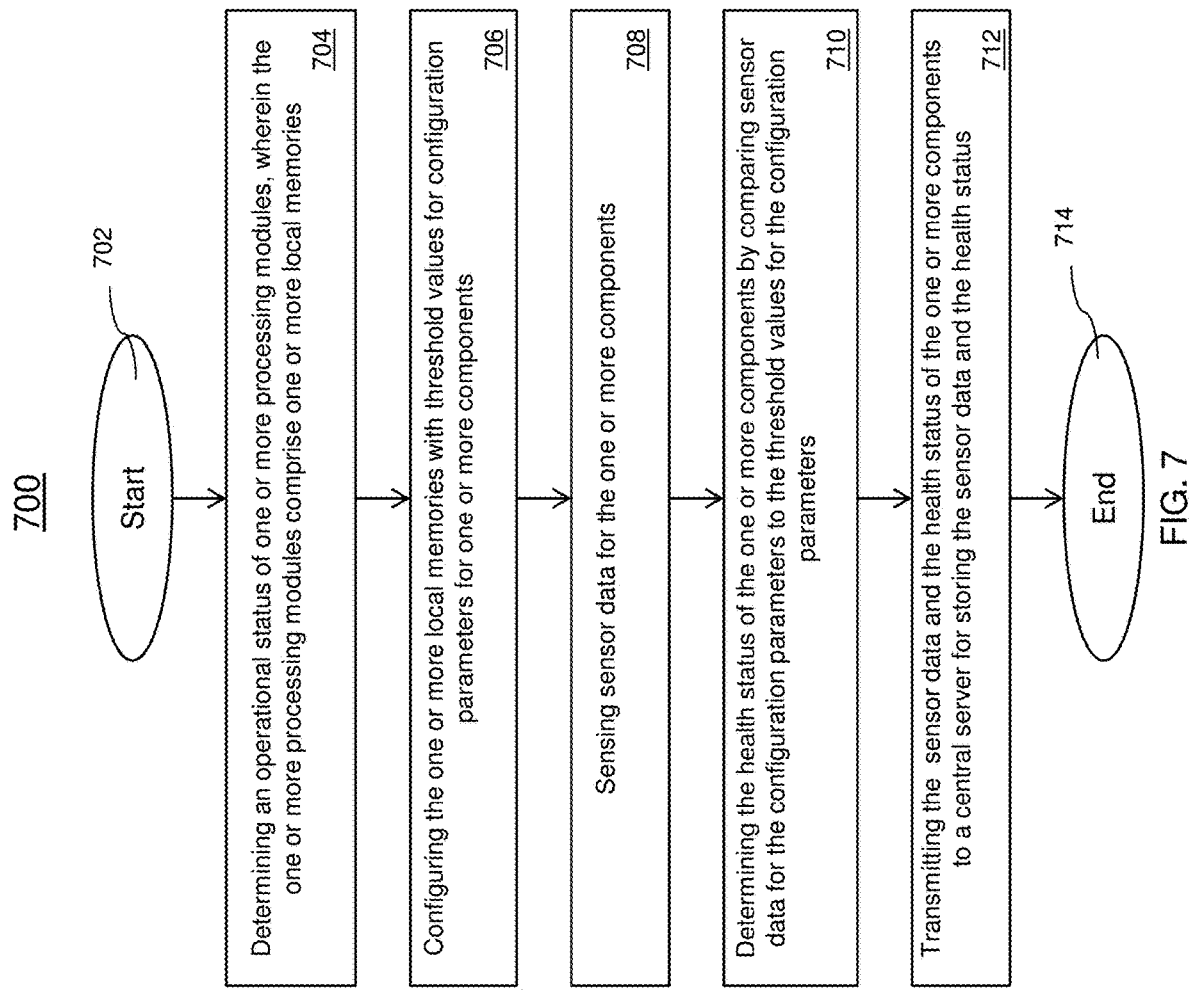

CONFIGURABLE DISTRIBUTED HEALTH MONITORING SYSTEM FOR A LANDING SYSTEM

CROSS-REFERENCE TO RELATED APPLICATIONS

This application claims the benefit of Indian Application No. 201811037755 filed Oct. 5, 2018, which is incorporated herein by reference in its entirety.

BACKGROUND

Exemplary embodiments pertain to the art of monitoring systems and more particularly to, a configurable distributed health monitoring system for landing system.

Aircraft are very complex having a range of systems that must be maintained to ensure the safety of the passengers and crew. For example, aircraft include various communication systems, electrical and mechanical systems, etc. that must be managed. In addition, aircraft often include redundant systems in the event a failure occurs in the primary system. There is a need to intelligently implement redundant systems for the aircraft.

BRIEF DESCRIPTION

According to an embodiment, a configurable distributed health monitoring system for a landing system is provided. The health monitoring system includes a server configured to store data related to one or more components; a processor operably coupled to the server, wherein the processor determines an operational state of one or more processing modules; wherein the one or more processing modules comprise local memories and sensors configured to monitor an operation of the one or more components, wherein the one or more processing modules are operably coupled to the server to obtain threshold values for configuration parameters for the one or more components; and wherein the processor determines a health status of the one or more components based at least in part on comparing sensor data for the configuration parameters to the threshold values for the configuration parameters.

In addition to one or more of the features described herein, or as an alternative, further embodiments include components that are aircraft landing gear struts.

In addition to one or more of the features described herein, or as an alternative, further embodiments include configuration parameters that are threshold values for temperature, pressure, and encoder for the aircraft landing gear struts.

In addition to one or more of the features described herein, or as an alternative, further embodiments include a health status is based at least in part on sensor data including temperature data, pressure data, or encoder data for a landing gear strut.

In addition to one or more of the features described herein, or as an alternative, further embodiments include a processor that includes a plurality of connections including a primary channel for the one or more processing modules and a secondary channel for the one or more processing modules.

In addition to one or more of the features described herein, or as an alternative, further embodiments include a centralized memory server.

In addition to one or more of the features described herein, or as an alternative, further embodiments include a server that is located on the aircraft.

In addition to one or more of the features described herein, or as an alternative, further embodiments include configuration parameters for the one or more components that are stored in the server that is indexed using at least one of an aircraft tail number or component serial number.

In addition to one or more of the features described herein, or as an alternative, further embodiments include processing modules that are located on individual circuit card assemblies.

According to another embodiment, a method for monitoring components of a system is provided. The method includes determining, by a processor, an operational status of one or more processing modules, wherein the one or more processing modules comprise one or more local memories; configuring the one or more local memories with threshold values for configuration parameters for one or more components; sensing sensor data for the one or more components; determining the health status of the one or more components by comparing sensor data for the configuration parameters to the threshold values for the configuration parameters; and transmitting the sensor data and the health status of the one or more components to a central server for storing the sensor data and the health status.

In addition to one or more of the features described herein, or as an alternative, further embodiments include one or more components that are landing gear struts.

In addition to one or more of the features described herein, or as an alternative, further embodiments include configuration parameters that are threshold values for the temperature, pressure, and encoder of the landing gear struts.

In addition to one or more of the features described herein, or as an alternative, further embodiments include configuring one or more local memories with threshold values for configuration parameters for the one or more components based at least in part on an aircraft tail number or a strut serial number.

In addition to one or more of the features described herein, or as an alternative, further embodiments include threshold values for the configuration parameters that are stored in a local memory of the one or more processing modules and the central server.

In addition to one or more of the features described herein, or as an alternative, further embodiments include indexing the configuration parameters for the one or more components in the central server, wherein indices for the configuration parameters are based at least in part on an aircraft tail number or component serial number.

In addition to one or more of the features described herein, or as an alternative, further embodiments include an operational status that indicates at least one of an active state or a failed state of the one or more processing modules.

In addition to one or more of the features described herein, or as an alternative, further embodiments include one or more processing modules that include primary and secondary communication channels to the processor.

In addition to one or more of the features described herein, or as an alternative, further embodiments include responsive to determining the operational status for one or more processing modules are in a failed state, switching to the secondary communication channels.

In addition to one or more of the features described herein, or as an alternative, further embodiments include configuring the one or more processing modules by detecting a pin configuration of the one or more processing modules.

In addition to one or more of the features described herein, or as an alternative, further embodiments include assembling one or more processing modules on individual circuit card assemblies.

Technical effects of embodiments of the present disclosure include providing a redundant monitoring system that is readily configurable upon detecting a failure. This alleviates the time consumed in performing manually inspections and allows for efficiently replacement of components in the event of the failure.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 7 depicts a flowchart of a method for monitoring a system in accordance with one or more embodiments.

DETAILED DESCRIPTION

Figure 1:
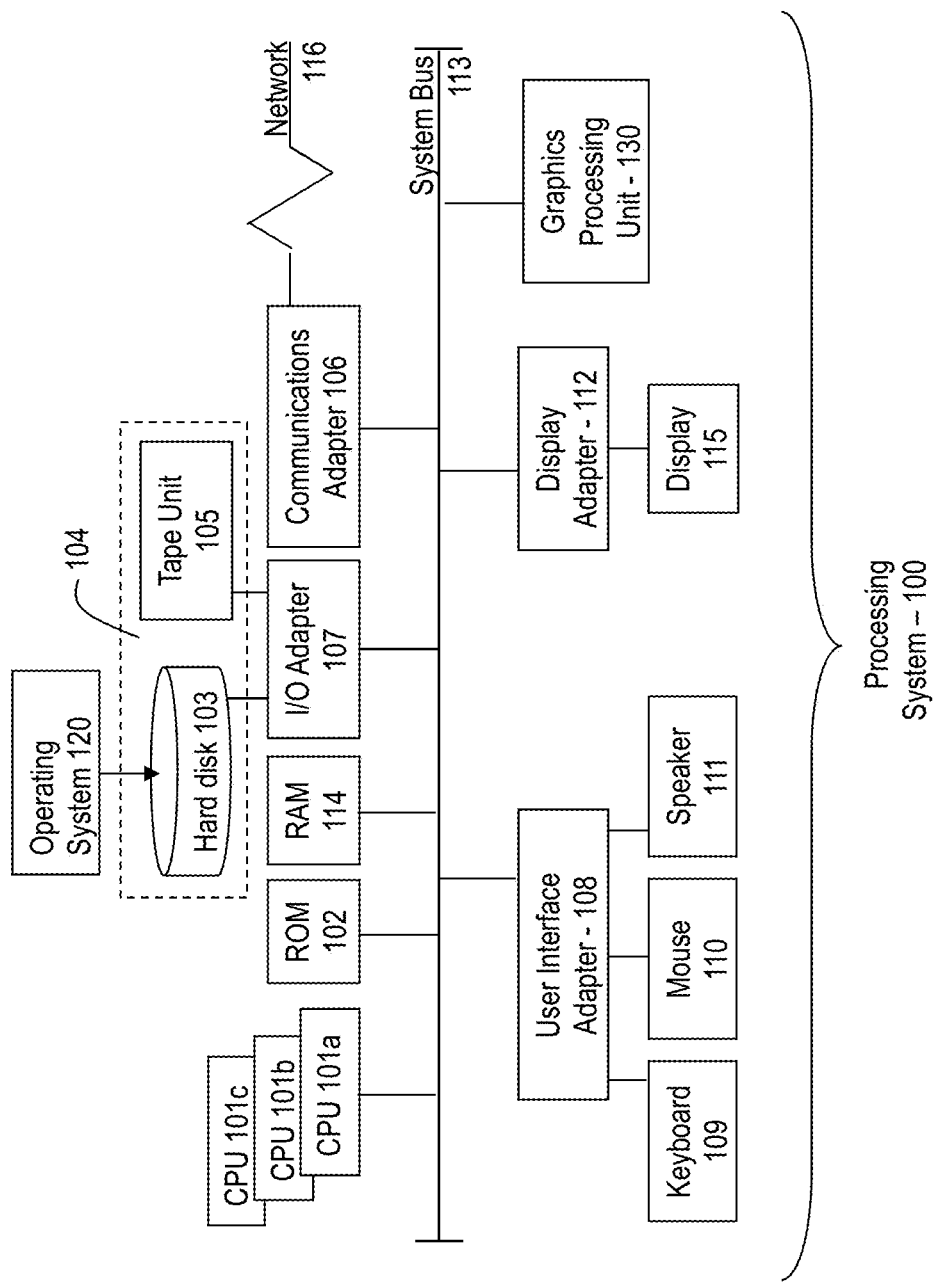
FIG. 1 is a block diagram illustrating one example of a processing system for practice of the teachings herein.

Aircraft include landing gear systems that must be inspected after each landing. The landing gear systems include shock absorbers or struts that are configured to attenuate the impact of the landing. In addition, the shock absorbers and struts are configured to dampen the vertical oscillations experienced by the aircraft. While the aircraft is on the ground it is supported by the compressed gas in the strut's cylinder. When the aircraft lands or taxis over bumps, the compressed gas absorbs the impact and the oil is forced through an orifice which dampens the resulting oscillation. During each inspection after landing, the number of moles of gas and oil volume of the struts are manually inspected by a service engineer.

The service engineer must be knowledgeable about each different type of strut as the operational parameters vary based on the type of strut, the position of the strut, type of aircraft, etc. In today's environment, although much of the manual inspection of the struts is accomplished by sensors, there is no redundancy in the systems that perform this task. There are high levels of maintenance effort and operational costs for data collection and connectivity with GSE because the data is collected from each electronic monitoring box individually.

In the conventional architecture, the electronic monitoring boxes are dedicated to each strut. In addition, each of the electronic monitoring boxes includes fixed code for the type of strut that is being monitored. Therefore, the landing gear configuration and parameters, which varies in type, must be individually located and installed in the new electronic box in the event of replacement. The correct configuration parameters must be verified after being uploaded to the appropriate box to ensure the struts are operating in the appropriate ranges. The failure of the electronic box will interrupt the monitoring of the landing and replacement is a burdensome process. Upon failure of a monitoring box, the previously collected data is no longer accessible because it is stored locally. In addition, memory corruption can cause further issues.

The techniques described herein provide for a redundant monitoring architecture that leverages a centralized server for dynamically configuring one or more electronic boxes. The centralized server stores the configuration parameters and desired operating ranges for each type of component which can vary among the different aircraft, equipment type, equipment location, etc. In one or more embodiments, the data, such as the configuration parameters, thresholds, operating limits, etc. are stored and indexed by the aircraft tail number and aircraft identifier in a centralized server and can be easily updated to a line replaceable unit during a power-up phase of the unit. The architecture allows for electronic boxes to be easily interchanged and the configuration parameters for the landing gear strut to be dynamically loaded into the local memory of the electronic box. In addition, the sensor data from the sensors are transmitted to the centralized server as a redundant copy in the event the failure of one or more electronic boxes occurs.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
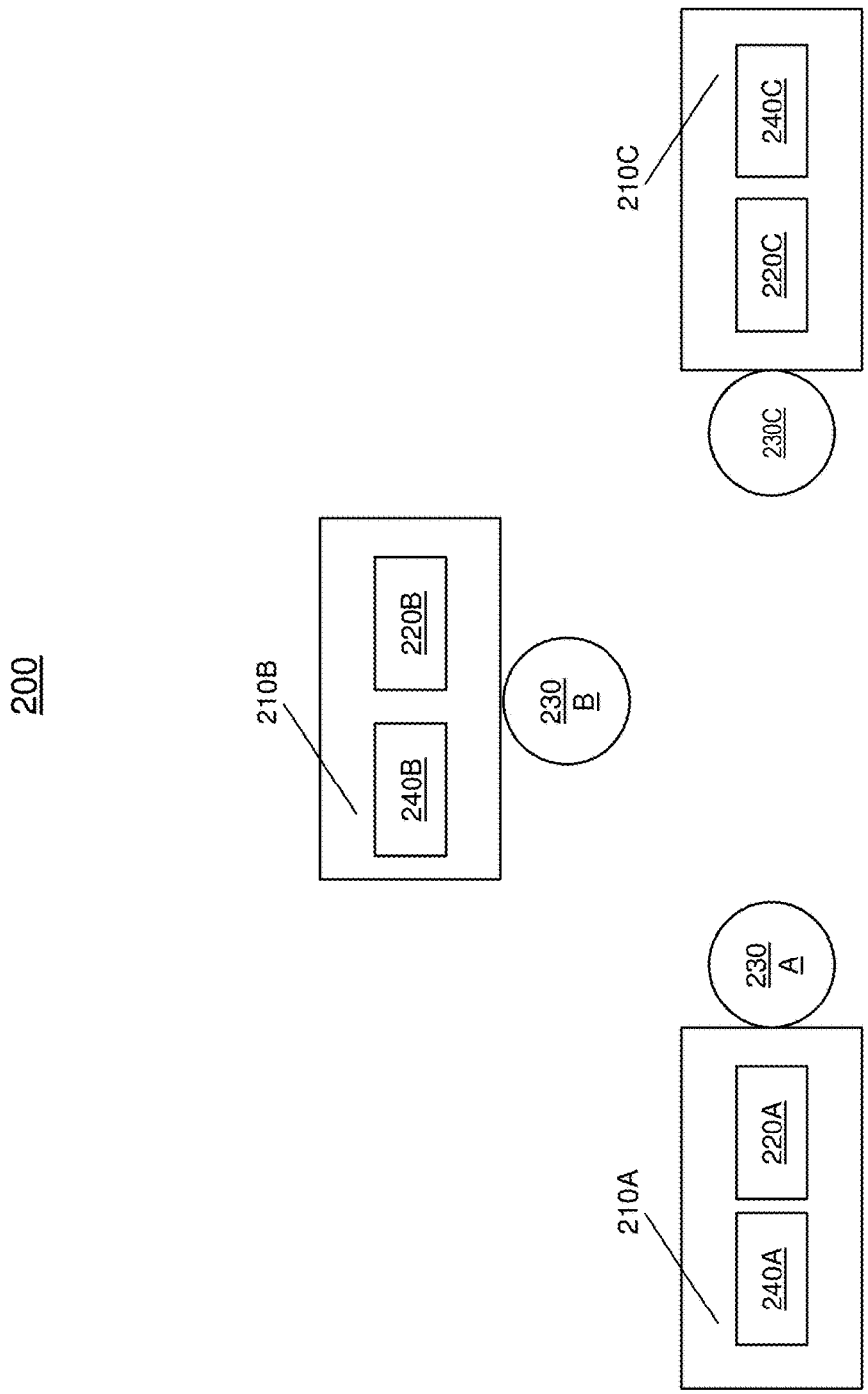
FIG. 2 depicts an architecture of a landing gear monitoring system.

In FIG. 2, an architecture of a monitoring system 200 for a landing system is shown. A plurality of processing modules 210A, 210B, and 210C are shown. The processing modules 210 are also known as electronic boxes that include a plurality of components for processing the collected data. As shown in FIG. 2, each of the modules 210 include a respective local memories (220A, 220B, 220C and 240A, 240B, 240C) and is operably coupled to a respective landing gear strut 230A, 230B, and 230C such as the main landing gear strut for the left and right side of the aircraft and the landing gear strut for the nose location of the aircraft. In one or more embodiments, local memories for each module 210 can include RAM and NOVRAM. In some embodiments, the RAM is a volatile memory and can be used for run-time calculations The NOVROM is a nonvolatile memory and can store the configuration parameters. The parameters values will be used to perform mathematical calculation and stores the calculated value. Each of the modules 210 can include one or more sensors to monitor the landing gear strut 230 of an aircraft. The modules 210 are configured to collect data from the struts and store the data in the local memories 220, 240 which can be used to determine a health status of the landing gear strut 230. The modules 210 collect temperature data, pressure, and stroke data from the sensors. The oil/gas levels can be calculated from the temperature data, pressure data, and encoder (stroke) data to determine the health status of the strut. The data can be collected using sensors that include but are not limited to temperature sensors, pressure sensors, encoders, etc. This determined health status of the strut can be used to determine if maintenance is required. The information can indicate the aircraft has experienced a hard landing, fault, or other state related to the landing system.

Figure 3:
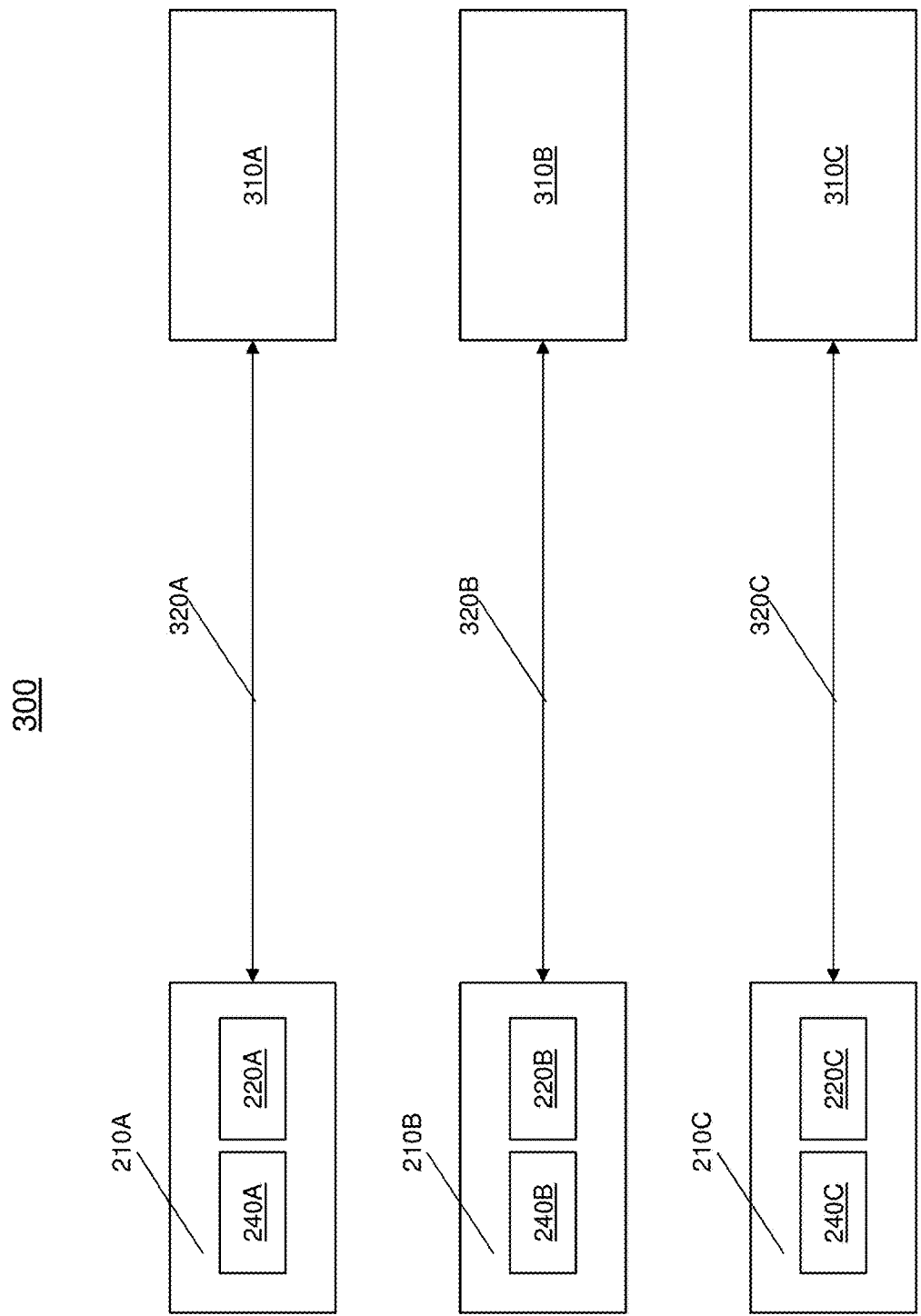
FIG. 3 depicts another independent architecture of a landing gear system.

In FIG. 3, an architecture for the system 300 is shown. As shown in FIG. 3, the modules 210 each communicate with a computing device 310 over respective channels 320. The computing device 310 can be associated with the ground support equipment (GSE) or another system. The data that is exchanged over the channels include configuration parameter information, calibration information, alarm/fault information, data log, etc. For example, module 210A communicates with computing device 310A over a channel 320A; module 210B communicates with computing device 310B over a channel 320B; and module 210C communicates with computing device 310C over a channel 320C. The channels connecting the computing devices 310 and the modules 210 can be wired and/or wireless channel In the event the module 210A which monitors the nose landing gear strut fails, the data that was collected and stored on the local memory 220 is unusable since no redundancy exists in the system 300. As shown, there is no redundancy provided in this architecture in the event of a failure and each processing module 210 must be individually replaced and configured for operation.

Figure 4:
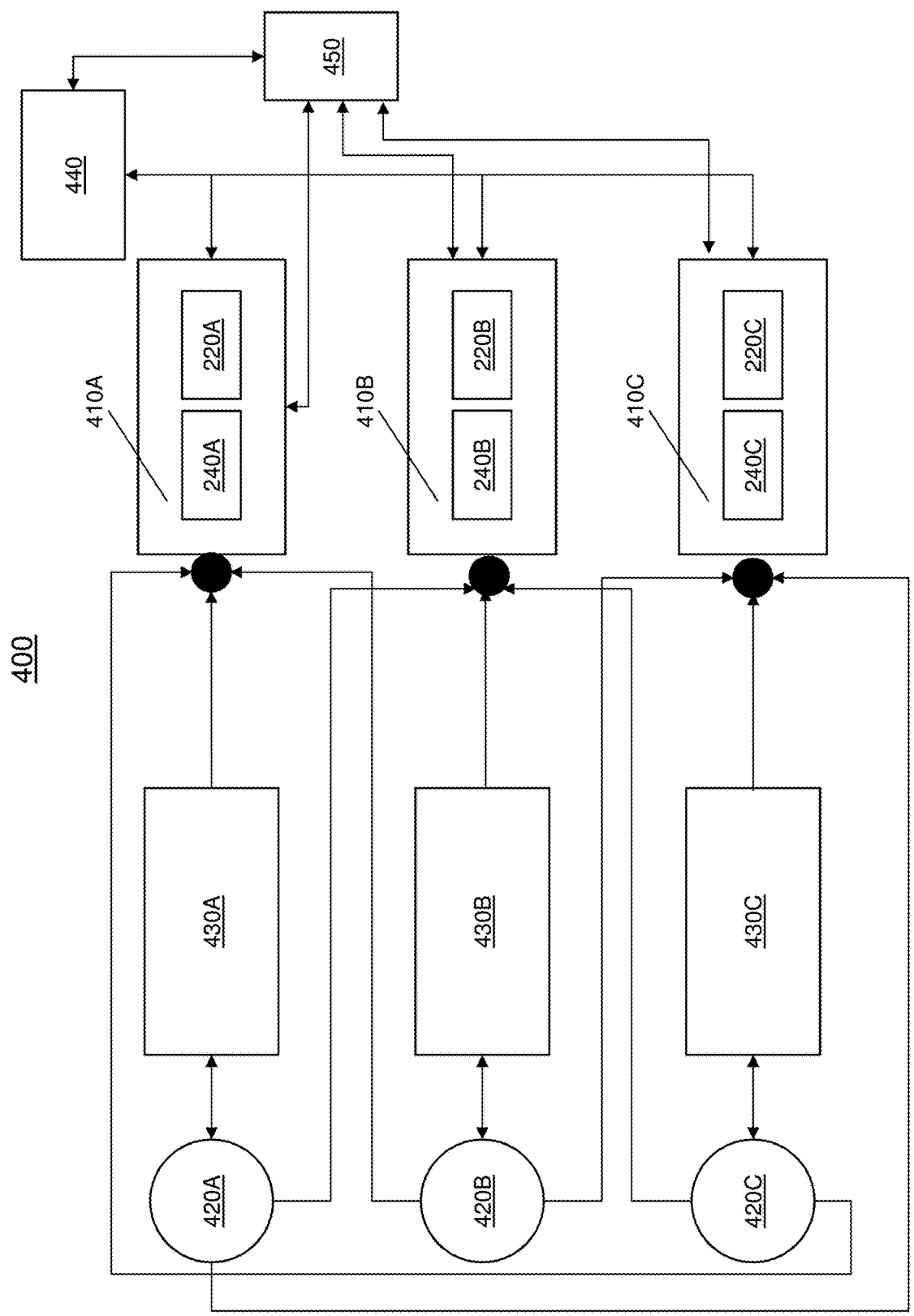
FIG. 4 depicts an architecture for monitoring a system in accordance with one or more embodiments.

Turning now to a more detailed description of the aspects described herein, FIG. 4 depicts an architecture of a system 400 for monitoring the landing gear struts of an aircraft. As shown in FIG. 4, the system 400 includes a plurality of modules 410A, 410B, and 410C that are each coupled to landing gear struts 420A, 420B, and 420C and sensor packages 430A, 430B, and 430C. In this non-limiting architecture, the module 410A is coupled to the left main landing gear strut 420A, the module 410B is coupled to the nose landing gear strut 420B, and the module 410C is coupled to the right landing gear strut 420C. The sensor packages 430 can include but are not limited to pressure sensors, temperature sensors, and encoders that are coupled to the struts 420A, 420B, and 420C.

As shown in FIG. 4, the system 400 includes redundancy among processing modules 410A, 410B, and 410C. Each of the processing modules 410 are operably coupled to the sensors packages 430 and struts 420 in the event of a failure of one or more of the processing modules.

Also shown in FIG. 4 is a server 440 which is operably connected to each of the modules 410. The server 440 is configured to store the configuration parameters for each of the landing gear struts 420A, 420B, and 420C. During a power ON phase, the operational state of each of the processing modules 410 are checked and then the appropriate configuration parameters are downloaded from the server 440 according to the type of strut to be monitored. In one or more embodiments, the server 440 is a centralized server and is configured to store the landing gear type information and aircraft type information for all aircraft. The server 440 stores information such as the aircraft tail number, the hardware part number information, serial information, all landing gear types, etc. In one or more embodiments, the components of the aircraft can be indexed in the server 440 using the aircraft tail number and the part number. In one or more embodiments, the server 440 is periodically updated to ensure the latest information is maintained on the server 440 as new types of struts, configuration parameters, calibration parameters, etc. are developed.

The server 440 is also configured to store the data collected from each of the sensor packages 430 and can also store the data according to the phase the data was collected such as landing phase, flight phase, or takeoff phase. In one or more embodiments, the data is initially stored in the local memories 220, 240 of each of the modules 410, where a central copy of the data is maintained at the server 440 as a redundant copy in the event of the failure of the modules 410 where the data stored in the local memories 220, 240 are inaccessible. The server 440 is configured to communicate with the modules 410 over a wired/wireless communication channel.

FIG. 4 also depicts another computing device 450 which can be coupled to each of the processing modules 410 to perform various processes and calculations. The computing device 450 can communicate over the wired/wireless communication channels. In one or more embodiments, the computing device 450 can be associated with the GSE which provides support for the aircraft. It should be understood that different configurations and number of modules, struts, and sensors can be used.

Figure 5:
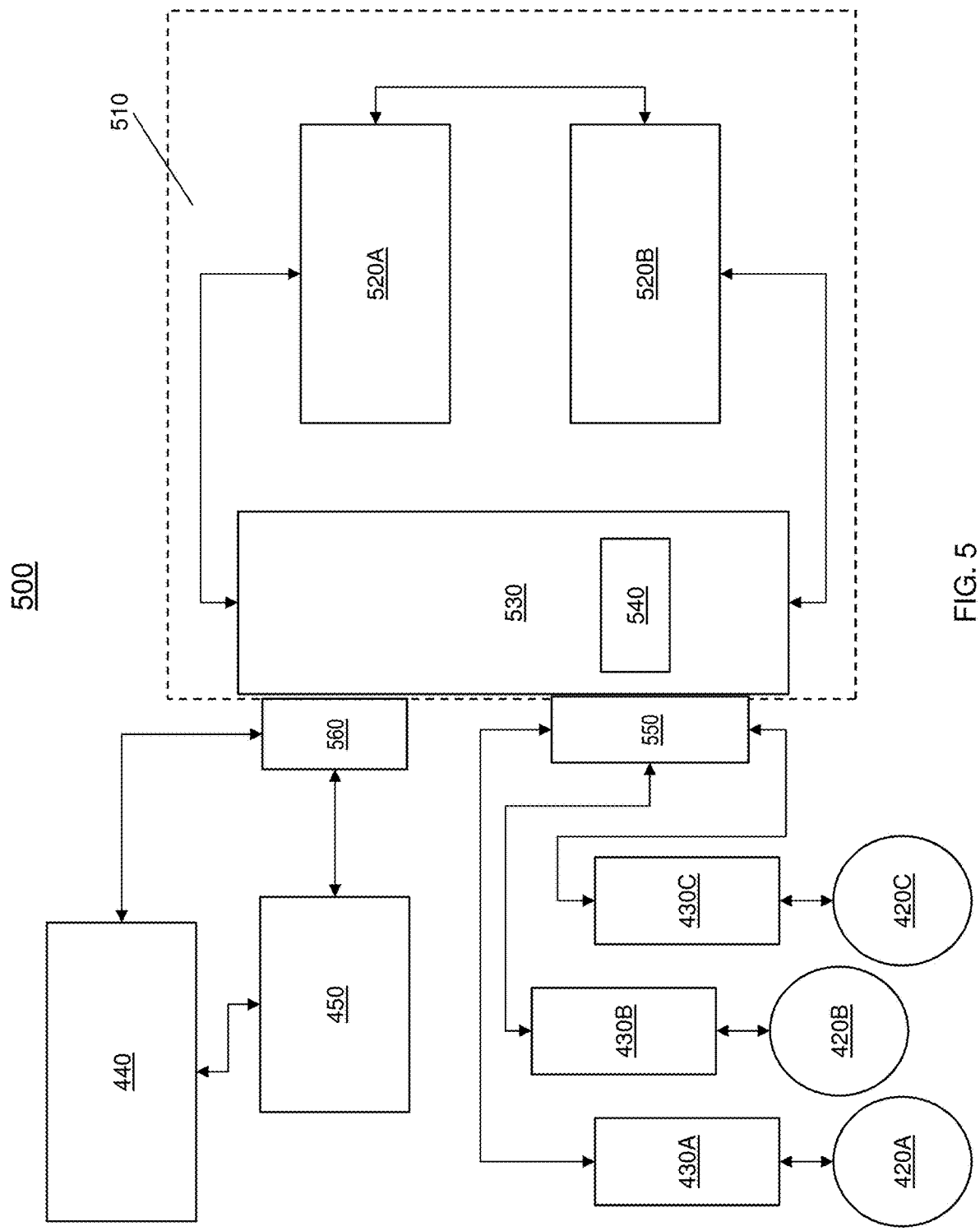
FIG. 5 depicts a primary and secondary circuit card assembly (CCA) architecture for monitoring a system in accordance with one or more embodiments.

FIG. 5 depicts an architecture 500 for monitoring the landing system in accordance with one or more embodiments. The module 510 includes a first circuit assembly card (CCA) 520A that is configured as the primary CCA for monitoring the landing gear system over a primary channel, and also includes a second CCA 520B is configured as the second CCA for monitoring the landing gear system over a second channel in the event that a failure is detected. The CCAs 520 are coupled to a common interface motherboard 530 (hereinafter referred as motherboard 530) according to a pin configuration. The pin configuration allows for the automatic detection of the primary and second CCA roles during the power-up phase. The motherboard 530 can include a primary pin, a secondary pin, and another secondary pin which is used to configure the priority of the CCAs 520 during a failure event. The motherboard 530 can also include a memory (optional) 540. In one or more embodiments, the memory 540 can include a volatile and non-volatile memories. The motherboard 530 can include software that is configured to exchange health status information between the primary channel and the secondary channel to determine the active status or failed status of the CCAs 520. The motherboard 530 includes an interface 550 that receives the data from the struts 420 and processing modules 430. In addition, the motherboard 530 includes an interface 560 that is configured to exchanged data with the server 440 and computing device 450.

When the first CCA 520A is configured as the primary CCA, that is it is connected to the primary pin of the motherboard 530, it is configured to receive all of the sensor information from the landing gear struts 420A, 420B, and 420C and process all of the data, where the data includes oil/gas pressure data, temperature data, and rotary encoder sensor data. When a failure of the first CCA 520A is detected the second CCA 520B transitions to the active state and receives all of the sensor information from the struts 420A, 420B, and 420C. The communication channels can include wired/wireless communication channels that communicate using various standards including but not limited to infrared, Bluetooth, cellular, RFID, etc.

In one or more embodiments, the connections between the computing system 450 and the processing modules 510 are a wired/wireless communication channels. The server 440 can communicate with the computing system 450 and the processing modules 510 over a wired/wireless communication channels. The computing system 450 can be a GSE.

Figure 6:
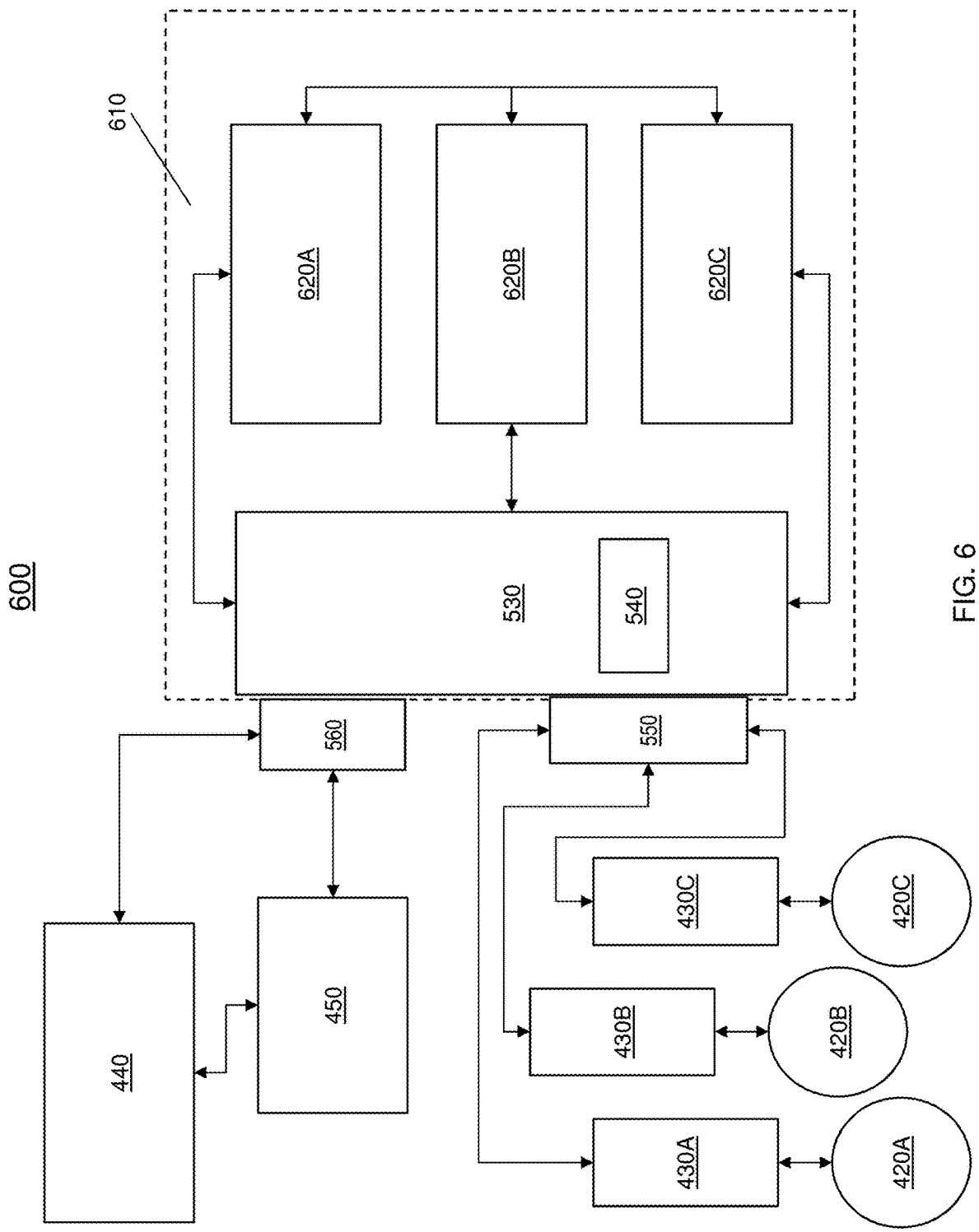
FIG. 6 depicts a distributed CCA architecture for monitoring a system in accordance with one or more embodiments.

In FIG. 6, a different architecture for a system 600 for monitoring a landing gear system is provided. As shown in FIG. 6, a processing module 610 includes a plurality of CCAs 620A, 620B, and 620C for monitoring one or more components of a system. For example, the components can include landing gear struts of an aircraft. In this non-limiting example, the CCA 620A can be configured to monitor the left main landing gear strut 420A of a landing gear system; CCA 620B is configured to monitor the nose landing gear strut 420B; and CCA 630 is configured to monitor the right main landing gear strut 420C.

In the event of a failure of the CCA 620A, another CCA 620B or 620C can take over the monitoring responsibilities of the failed CCA 620A. The CCA 620 that takes over the responsibilities of the failed CCA depends on the pin configuration (hardware configuration) to the motherboard 530. Unlike the architecture shown in FIG. 5, the system 600 of FIG. 6 distributes the monitoring of each of the struts 420 among the available CCAs 620.

In FIG. 7, a flowchart of a method for 700 in accordance with one or more embodiments is shown. The method 700 begins at block 702 and proceeds to block 704 which provides for determining an operational status of one or more processing modules, wherein the one or more processing modules comprise one or more local memories. In one or more embodiments, the operational status (active/failed) of each processing module is determined. At block 706, the method 700 provides for configuring the one or more local memories with threshold values for configuration parameters for one or more components. In one or more embodiments, the configuration parameters include threshold values for the temperature, pressure, and encoder associated with a component such as the landing gear strut. The threshold values are specific to the type of landing gear strut and the location of the landing gear strut on the aircraft. In one or more embodiments, the configuration parameters can also include additional data such as calibration data, failure mode data, etc. At block 708, the method 700 provides for sensing sensor data for the one or more components. The sensors are coupled to the one or more components and collect the sensor data related to the current temperature, pressure, encoder, etc. readings for the components. Block 710 provides for determining the health status of the one or more components by comparing sensor data for the configuration parameters to the threshold values for the configuration parameters. The method 700 at block 712 provides for transmitting the sensor data and the health status of the one or more components to a central server for storing the sensor data and the health status. In one or more embodiments, the sensor data and the health status for the components are stored at the central server to serve as a backup copy in the event a failure of a processing module occurs. The data that was collected by the previous processing module will not be lost but is still accessible to the system. In one or more embodiments various data can be provided to a central server and/or GSE indicating maintenance or service is required. In the event a failed processing module is replaced the configuration parameters for the particular component type can be located in the central server and stored in the local memory of the processing module making the replacement a seamless process. The appropriate configuration parameters for the component can be located in the central server by performing a search for the configuration parameters using the aircraft tail identifier and/or component serial number. The method 700 ends at block 712.

Although the techniques described herein are directed towards a system for monitoring landing gear system, it should be understood that it can be applied to any system that uses sensors and modules to monitor components wherein the central server is configured to store the necessary information for the components including serial/model numbers of the component, configuration parameters, operating points, calibration information, etc.

The technical effects and benefits overcome the single point of failure by providing data redundancy utilizing a central server to store the collected data and the configuration parameters for each of the components of the landing gear system. The centralized server eliminates the need to have the separate electronics boxes for each strut programmed with strut specific configuration. In addition, the data that is collected by each of the sensors are provided to the centralized server. In the event of a failure, the data that is stored in the local memory of each electronic box a redundant copy of the data is transmitted to the centralized server and the data is not lost.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a server configured to store data related to one or more components;
   a processor operably coupled to the server, wherein the processor determines an operational state of one or more processing modules;
   wherein the one or more processing modules comprise local memories and sensors configured to monitor an operation of the one or more components, wherein the one or more processing modules are operably coupled to the server to obtain threshold values for configuration parameters for the one or more components, wherein each processing module of the one or more processing modules are located on individual circuit card assemblies; and
   wherein the processor determines a health status of the one or more components based at least in part on comparing sensor data for the configuration parameters to the threshold values for the configuration parameters.

2. The system of claim 1, wherein the one or more components are aircraft landing gear struts.

3. The system of claim 2, wherein the configuration parameters comprise threshold values for temperature, pressure, and encoder for the aircraft landing gear struts.

4. The system of claim 1, wherein the health status is based at least in part on sensor data including temperature data, pressure data, or encoder data for a landing gear strut.

5. The system of claim 1, wherein the processor comprises a plurality of connections including a primary channel for the one or more processing modules and a secondary channel for the one or more processing modules.

6. The system of claim 1, wherein the server is a centralized memory server.

7. The system of claim 1, wherein the server is located on the aircraft.

8. The system of claim 1, wherein the configuration parameters for the one or more components stored in the server are indexed using at least one of an aircraft tail number or component serial number.

9. A method for monitoring components of a system, the method comprising:
   determining, by a processor, an operational status of one or more processing modules, wherein the one or more processing modules comprise one or more local memories;
   assembling each processing module of the one or more processing modules on individual circuit card assemblies;
   configuring the one or more local memories with threshold values for configuration parameters for one or more components;
   sensing sensor data for the one or more components;
   determining the health status of the one or more components by comparing sensor data for the configuration parameters to the threshold values for the configuration parameters; and
   transmitting the sensor data and the health status of the one or more components to a central server for storing the sensor data and the health status.

10. The method of claim 9, wherein the one or more components comprises landing gear struts.

11. The method of claim 10, wherein the configuration parameters comprise threshold values for the temperature, pressure, and encoder of the landing gear struts.

12. The method of claim 9, wherein configuring the one or more local memories with threshold values for configuration parameters for the one or more components is based at least in part on an aircraft tail number or a strut serial number.

13. The method of claim 12, wherein the threshold values for the configuration parameters are stored in a local memory of the one or more processing modules and the central server.

14. The method of claim 13, further comprising indexing the configuration parameters for the one or more components in the central server, wherein indices for the configuration parameters are based at least in part on an aircraft tail number or component serial number.

15. The method of claim 9, wherein the operational status indicates at least one of an active state or a failed state of the one or more processing modules.

16. The method of claim 9, wherein each processing module of the one or more processing modules comprise primary and secondary communication channels to the processor.

17. The method of claim 16, responsive to determining the operational status for one or more processing modules is in a failed state, switching to the secondary communication channels.

18. The method of claim 9, wherein configuring the one or more processing modules comprises detecting a pin configuration of the one or more processing modules.

* * * * *